United States Patent [19]

Ikeda

[11] Patent Number: 5,045,955
[45] Date of Patent: Sep. 3, 1991

[54] DIGITAL DATA RECORDING AND REPRODUCING APPARATUS FOR RECORDING AND PRODUCING AN IMAGE ON AND FROM A VIDEO TAPE THROUGH MATRIX CONVERSION

[75] Inventor: Shigeyuki Ikeda, Tokyo, Japan
[73] Assignee: Hitachi Medical Corporation, Tokyo, Japan
[21] Appl. No.: 442,395
[22] Filed: Nov. 27, 1989

Related U.S. Application Data

[63] Continuation of Ser. No. 26,674, Mar. 17, 1987, abandoned.

[30] Foreign Application Priority Data

Mar. 17, 1986 [JP] Japan .................. 61-57013

[51] Int. Cl.$^5$ ............................. H04N 5/78
[52] U.S. Cl. .................... 360/9.1; 358/310; 358/335; 358/342
[58] Field of Search ............. 358/93, 11, 108, 294, 358/906, 310, 335, 342; 360/8, 9.1, 32, 35.1

[56] References Cited

U.S. PATENT DOCUMENTS

| | | | |
|---|---|---|---|
| 4,318,137 | 3/1982 | Cordova et al. | 360/9.1 X |
| 4,395,738 | 7/1983 | Hedlund et al. | 360/32 X |
| 4,463,387 | 7/1984 | Hashimoto et al. | 358/310 |
| 4,613,908 | 9/1986 | Takahashi et al. | 360/9.1 X |
| 4,660,096 | 4/1987 | Arlan et al. | 358/335 X |
| 4,672,443 | 6/1987 | Dishert et al. | 358/11 X |
| 4,685,002 | 8/1987 | Powers | 360/9.1 |
| 4,758,907 | 7/1988 | Okamoto et al. | 360/32 X |
| 4,812,924 | 3/1989 | Fukami et al. | 360/32 |

Primary Examiner—Roy N. Envall, Jr.
Assistant Examiner—Hung Bui
Attorney, Agent, or Firm—Antonelli, Terry, Stout & Kraus

[57] ABSTRACT

In a digital data recording and reproducing apparatus which digitizes an input video signal, records or reproduces digital data on or from a magnetic recording medium of a recording and reproducing unit of the apparatus and converts the digital data read out of the recording and reproducing unit into an output video signal, a converting circuit is provided, on the input side of the recording and reproducing unit, which receives an input data signal of a larger sampling image matrix size than that for the recording and reproducing unit and divides the input image data signal into constituent sampling image matrix sizes by a predetermined fraction to deliver a divided image data signal at a data rate commensurate with the sampling image matrix size for the recording and reproducing unit, and an inverse-converting circuit is provided, on the output side of the recording and reproducing unit, which receives the divided image data signal and reconstructs it into an output image data signal of the original large sampling image matrix size. Information indicative of positions of the divisional image data from the converting circuit is recorded on part of the magnetic recording medium of the recording and reproducing unit and used by the inverse-converting circuit for the reconstruction into the original sampling image matrix size.

8 Claims, 3 Drawing Sheets

DIGITAL DATA RECORDING AND REPRODUCING APPARATUS FOR RECORDING AND PRODUCING AN IMAGE ON AND FROM A VIDEO TAPE THROUGH MATRIX CONVERSION

This application is a continuation of application Ser. No. 026,624, filed Mar. 17, 1987 now abandoned.

BACKGROUND OF THE INVENTION

This invention relates to a digital data recording and reproducing apparatus such as for example a digital video tape recorder (hereinafter simply referred to as a digital VTR) which digitizes a video signal to record and reproduce a digital signal and more particularly, to a digital data recording and reproducing apparatus capable of recording and reproducing even a high-definition image of a large sampling image matrix size defined by a great number of scanning lines.

In recent years, advancement in digital integrated circuits has promoted development of digital VTR's which digitize a television video signal to ensure recording and reproduction of high image quality. In the digital VTR, an input video signal received from an external image apparatus is digitized by means of an A/D converter, digital data is recorded on or reproduced from a magnetic recording medium such as a magnetic tape of a recording and reproducing unit of the digital VTR, and the digital data read out of the recording and reproducing unit is converted by a D/A converter into an output video signal. The digital VTR is operative to record and reproduce image frames pursuant to the NTSC system which is the existing standard television system, that is, 30 image frames/second defined by 525 horizontal scanning lines.

Recently, however, an image apparatus for imaging and displaying a high-definition image frame defined by 1050 scanning lines, which are twice as large as the scanning lines in the standard television system, has been developed especially in the field of medical image instruments in order to improve diagnostic capability based on medical images. Under the situations, the digital VTR whose ability to record and reproduce images is limited to images pursuant to the standard television system can not be employed for recording and reproducing the medical images of high-definition. In some applications, a digital VTR has been proposed which can record and reproduce the image frame defined by 1050 scanning lines but this type of digital VTR is increased in size and cost and is therefore impractical.

SUMMARY OF THE INVENTION

An object of this invention is to provide a digital data recording and reproducing apparatus capable of recording and reproducing even a high-definition image of a large sampling image matrix size defined by a great number of scanning lines.

According to the present invention, the above object can be accomplished by a digital data recording and reproducing apparatus which digitizes an input video signal, records or reproduces digital data on or from a magnetic recording medium of a recording and reproducing unit of the apparatus and converts the digital data read out of the recording and reproducing unit into an output video signal, wherein on the input side of the recording and reproducing unit, a converting circuit is provided which receives an input data signal of a larger sampling image matrix size than that for the recording and reproducing unit and divides the input image data signal into constituent sampling image matrix sizes by a predetermined fraction to deliver a divided image data signal at a data rate commensurate with the sampling image matrix size for the recording and reproducing unit, and an inverse-converting circuit is provided, on the output side of the recording and reproducing unit, which receives the divided image data signal and reconstructs it into an output image data signal of the original large sampling image matrix size, information indicative of positions of the divisional image data from the converting circuit being recorded on part of the magnetic recording medium of the recording and reproducing unit and used by the inverse-converting circuit for the reconstruction into the original sampling image matrix size.

DESCRIPTION OF THE PREFERRED EMBODIMENTS

The invention will now be described by way of example with reference to the accompanying drawings.

Figure 1:
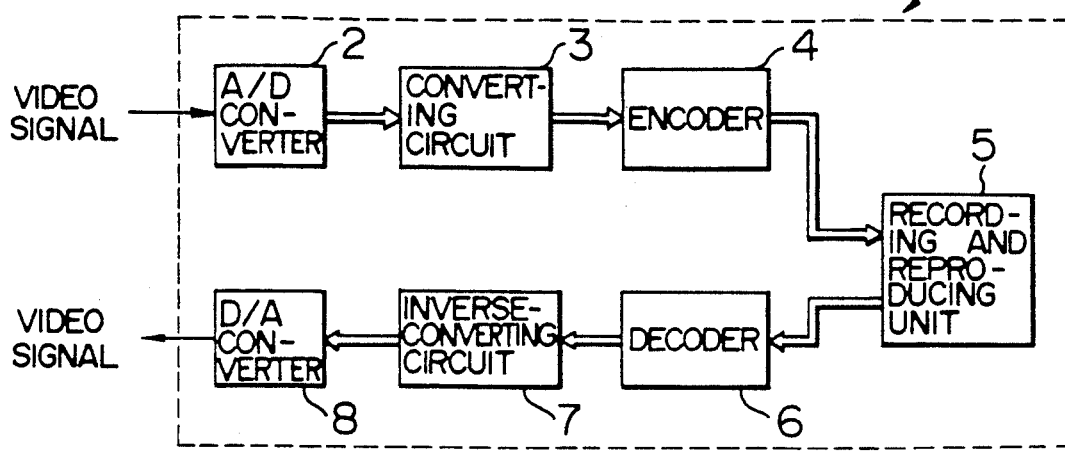
FIG. 1 is a block diagram illustrating a digital data recording and reproducing apparatus according to an embodiment of the invention.

Referring to FIG. 1, there is illustrated, in block form, a digital data recording and reproducing apparatus 1 embodying the invention which digitizes an input video signal received from an external image apparatus (not shown) to record or reproduce digital data and converts the read-out digital data into an output video signal. The apparatus comprises an A/D converter 2, a converting circuit 3, an encoder 4, a recording and reproducing unit 5, a decoder 6, an inverse-converting circuit 7, and a D/A converter 8. The A/D converter 2 is adapted to digitize the input video signal received from the not shown external image apparatus such as a medical image instrument based on, for example, a 1050-scanning line system.

Figure 2:
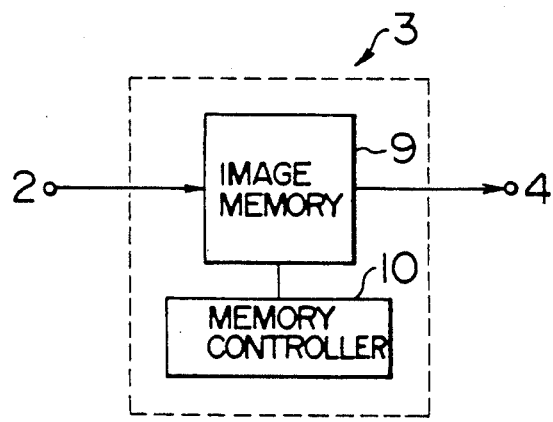
FIG. 2 is a block diagram illustrating details of a converting circuit.

Connected to the A/D converter 2 is the converting circuit 3. This converting circuit 3 receives an input data signal of a sampling image matrix size of, for example, 1050 (horizontal) × 1050 (vertical) which is larger than a sampling image matrix size of 525 (horizontal) × 525 (vertical) for the recording and reproducing unit 5 to be described later and divides the input data signal into constituent sampling image matrix sizes by a predetermined fraction, for example, at four divisions to deliver a divided image data signal at a data rate commensurate with the sampling image matrix size for the recording and reproducing unit 5, together with information indicative of positions of the divisional image data. As shown in FIG. 2, the converting circuit 3 comprises an image memory 9 and a memory controller 10. The image memory 9 is for writing the image data received from the A/D converter and sequentially reading the image data and has a size corresponding to, for example, the 1050×1050 sampling image matrix size. The memory controller 10 is adapted to control the write/read of the image data with respect to the image memory 9 and controls write/read addresses to write the image data of the 1050×1050 sampling image matrix size into the image memory 9 and to read the image data of the 525×525 sampling image matrix size from the image memory 9.

Connected to the converting circuit 3 is the encoder 4. This encoder 4 is operative to add to the digital data delivered out of the converting circuit 3 an error correction code which is used during reproduction for correcting a code error caused when recording. Provided on the output side of the encoder 4 is the recording and reproducing unit 5. This recording and reproducing unit 5 is operative to record and reproduce the digital data added with the error correction code by the encoder 4 and the information indicative of positions of the divisional image data on and from the magnetic recording medium such as the magnetic tape and it has a size corresponding to the 525×525 sampling image matrix size in the standard television system. Connected to the output of the recording and reproducing unit 5 is the decoder 6. This decoder 6 is operative to correct a code error in the digital data read out of the recording and reproducing unit 5 by using the error correction code added by the encoder 4.

Figure 3:
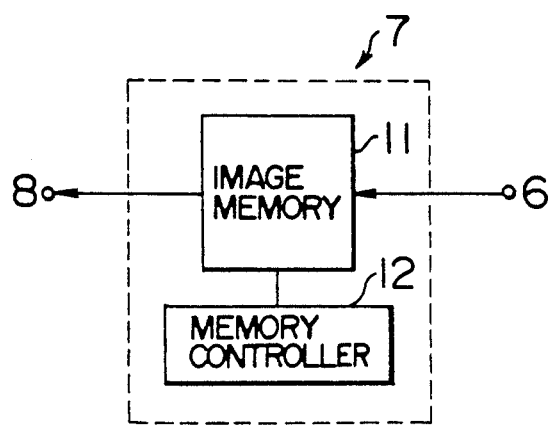
FIG. 3 is a block diagram detailing an inverse-converting circuit.

Connected to the decoder 6 is the inverse-converting circuit 7. This inverse-converting circuit 7 is operative to receive the divisional image data generated by the converting circuit 3, together with the divisional image data position information and to reconstruct the divisional image data into an output data signal of the 1050×1050 original large sampling image matrix size. As shown in FIG. 3, the inverse-converting circuit 7 comprises an image memory 11 and a memory controller 12. The image memory 11 is for writing the image data received from the decoder 6 and sequentially reading the image data and has a size corresponding to, for example, the 1050×1050 sampling image matrix size. The memory controller 12 is adapted to control the write/read of the image data with respect to the image memory 11 and controls write/read addresses to sequentially write the image data of the 525×525 sampling image matrix size into the image memory 11 and to read the image data of the 1050×1050 sampling image matrix size therefrom.

Connected to the inverse-converting circuit 7 is the D/A converter 8. This D/A converter 8 is operative to convert the digital data reconstructed by the inverse-converting circuit into an output video signal which in turn supplied to the not shown medical image instrument based on, for example, the 1050-scanning line system.

The operation of the digital data recording and reproducing apparatus constructed as above will now be described with reference to FIGS. 4 and 5. Firstly, when recording, the input video signal supplied from the not shown medical image instrument based on the 1050-scanning line system is digitized by the A/D converter 2, as will be seen from FIG. 1. Exemplarily, the sampling image matrix size inputted to the A/D converter 2 is of an effective size which measures 1024 (horizontal) ×960 (vertical). The digital image data are then fed to the converting circuit 3. The converting circuit 3 divides the image data by a predetermined fraction by writing and reading the image data to and from the image memory 9 under the address control by the memory controller 10 shown in FIG. 2, as will be explained below.

More particularly, during write of the image data to the image memory 9, the 1st to 1024th sampling (image) points on the first scanning line are first written and thereafter the 1st to 1024th sampling points on the second scanning line are written. FIG. 4 shows that this write operation repeats itself in a similar manner until the 1st to 1024th sampling points on the 960th scanning line are written sequentially in synchronism with the scanning in the not shown medical image instrument. Next, to explain read of the image data from the image memory 9 with reference to FIG. 4, the read operation starts at the time that the write operation for the 1024th sampling point on the 480th scanning line ends and image data within a first sampling image data area A of image memory 9 covering the 1st to 512nd sampling points (horizontal) on each of the 1st to 480th scanning lines (vertical) are read out as one image frame commensurate with a 512×480 sampling image matrix size in the standard television system. Subsequently, image data within a second sampling image data area B covering the 513rd to 1024th sampling points (horizontal) on each of the 1st to 480th scanning lines (vertical) are likewise read out as one image frame. By the time that reading image data within the second sampling image data area B ends, the write operation for the 1024th sampling point on the 960th scanning line has been completed. Therefore, the operation continues to read image data within a third sampling image data area C covering the 1st to 512nd sampling points (horizontal) on each of the 481st to 960th scanning lines (vertical), thus providing one image frame. Subsequently, image data within a fourth sampling image data area D covering the 513rd to 1024th sampling points (horizontal) on each of the 481st to 960th scanning lines (vertical) are read out as one image frame. In synchronism with the commencement of reading image data within the third sampling image data area C, the write operation for the next input image data is started so that the 1st to 1024th sampling points on each of the 1st to 960th scanning lines may be sequentially written. At the termination of reading image data within the fourth sampling image data area D, the write operation for the 1024th sampling point on the 480th scanning line is completed. Therefore, as in the case of the first input image data described previously, the operation continues to read image data within the first and second sampling image data areas C and D sequentially. The above write and read operations are repeated reiteratively. In this manner, under the address control by the memory controller 10, the input image data of the 1024×960 sampling image matrix size are written into the image memory 9 and divided at four divisions so as to be sequentially read out of the image memory 9 as the output image data of the 512×480 sampling image matrix size. Concurrently with the delivery of the divisional image data, the converting circuit 3 sends to the recording and reproducing unit 5 the information indicative of positions of the divisional image data. In this way, the converting circuit 3 converts the input image data into the output image data at a data rate commensurate with the sampling image matrix size for the recording and reproducing unit 5 based on the standard television system.

The digital data thus delivered out of the converting circuit 3 are fed to the encoder 4 so as to be added with the error correction code and thereafter supplied to the recording and reproducing unit 5 at which the digital data are recorded on video tracks of the magnetic recording medium such as a magnetic tape 13. Concurrently therewith, pieces $I_1$, $I_2$, $I_3$, --- of the information indicative of positions of the divisional image data in four divisions generated from the converting circuit 3 are recorded on part of an audio track 14 of the magnetic tape 13 in timed relationship with a vertical blanking signal B, thereby completing the recording of the digital data.

To reproduce the thus recorded digital data, the pieces $I_1$, $I_2$, $I_3$, --- of the divisional image data position information recorded on the audio track 14 of the magnetic tape 13 of recording and reproducing unit 5 are first read concurrently with sequential read of the divisional image data of the 512×480 sampling image matrix size. The divisional image data sequentially read out of the recording and reproducing unit 5 is then fed to the decoder 6, at which it is corrected for code error, and supplied to the inverse-converting circuit 7. The inverse-converting circuit 7 reconstructs the divisional image data into the original sampling image matrix size by writing and reading the image data to and from the image memory 11 under the address control by the memory controller 12 shown in FIG. 3, as will be explained below.

Figure 4:
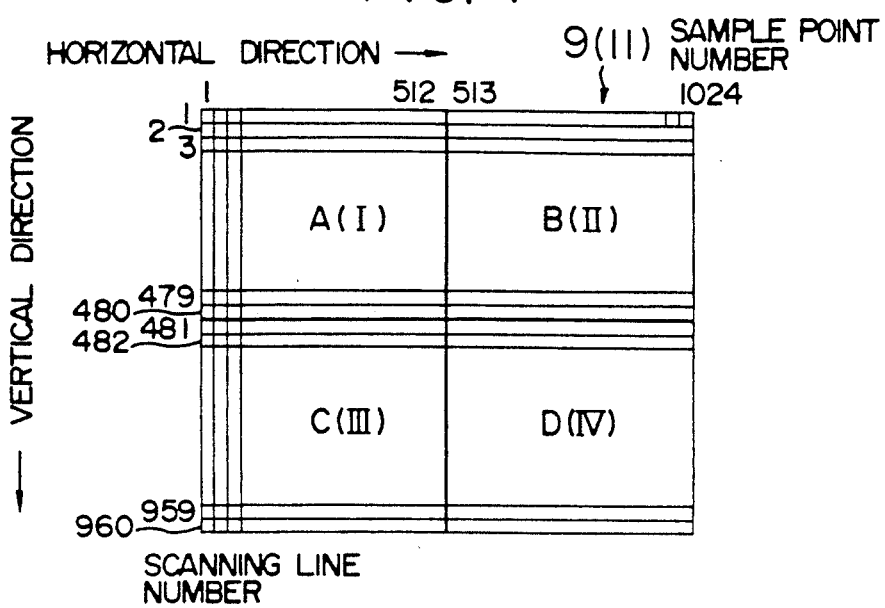
FIG. 4 is a diagram useful in explaining division and reconstruction operations by the converting circuit and inverse converting circuit.
Figure 5:
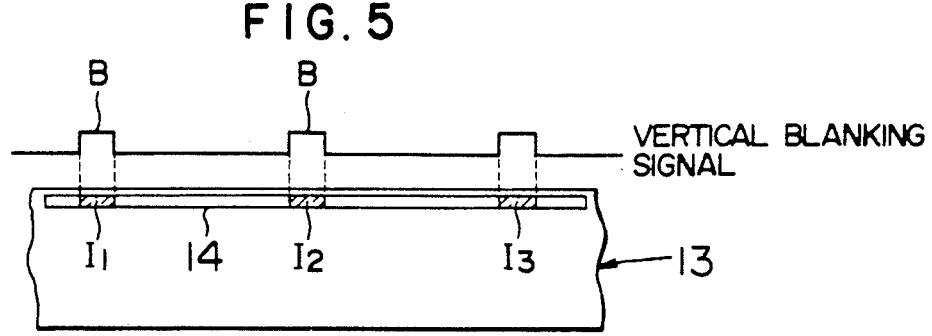
FIG. 5 is a diagram showing the recording state of information indicative of positions of divisional image data.

More particularly, during write of the image data into the image memory 11, the image data read out of the first sampling image data area A when recording are first written into a first (sampling image data) area I of image memory 11 as shown in FIG. 4 in accordance with the pieces $I_1$, $I_2$, $I_3$, --- of the position information recorded on the audio track 14 shown in FIG. 5, the first area I covering the 1st to 512nd sampling points (horizontal) on each of the 1st to 480th scanning lines (vertical). Subsequently, the image data read out of the second area B when recording are written into a second area II covering the 513rd to 1024th sampling points (horizontal) on each of the 1st to 480th scanning lines (vertical). By the time that writing image data into the second area II ends, the sequential write operation for image data covering the first sampling point on the first scanning line through the 1024th sampling point on the 480th scanning line has been completed. Therefore, the operation continues to sequentially read the 1st to 1024th sampling points on the first scanning line and finally the 1024th sampling point on the 480th scanning line. Concurrently with the read of the first sampling point on the first scanning line, the image data read out of the third area C when recording are written into a third area III covering the 1st to 512nd sampling points (horizontal) on each of the 481st to 960th scanning lines (vertical). Subsequently, the image data read out of the fourth area D when recording are written into a fourth area IV covering the 513rd to 1024th sampling points (horizontal) on each of the 481st to 960th scanning lines (vertical). By the time that writing image data into the fourth area IV ends, the sequential write operation for image data covering the first sampling point on the 481st scanning line through the 1024th sampling point on the 960th scanning line has been completed. Therefore, the operation continues to sequentially read the 1st to 1024th sampling points on the 481st scanning line and finally the 1024the sampling point on the 960th scanning line. In synchronism with the commencement of reading the first sampling point on the 481st scanning line, the write operation for the next input image data is started so that image data corresponding to the first area A may be written into the first area I and then image data corresponding to the second area B may be written into the second area II. At the termination of reading image data covering the 1024th sampling point on the 960th scanning line, the write operation of the next input image data into the first and second areas I and II is completed. Therefore, as in the case of the first input image data described previously, the operation continues to read the first sampling point on the first scanning line through the 1024th sampling point on the 480th scanning line sequentially. The above write and read operations are repeated reiteratively. In this manner, under the address control by the memory controller 12, the input divisional image data of the 512×480 sampling image matrix size are written into the image memory 11 and reconstructed into the output image data of the original 1024×960 sampling image matrix size.

The digital data delivered out of the inverse-converting circuit 7 are fed to the A/D converter 8 so as to be converted into the video signal which is supplied to the not shown medical image instrument based on, for example, the 1050-scanning line system, thus completing the reproduction of the digital data.

Figure 6:
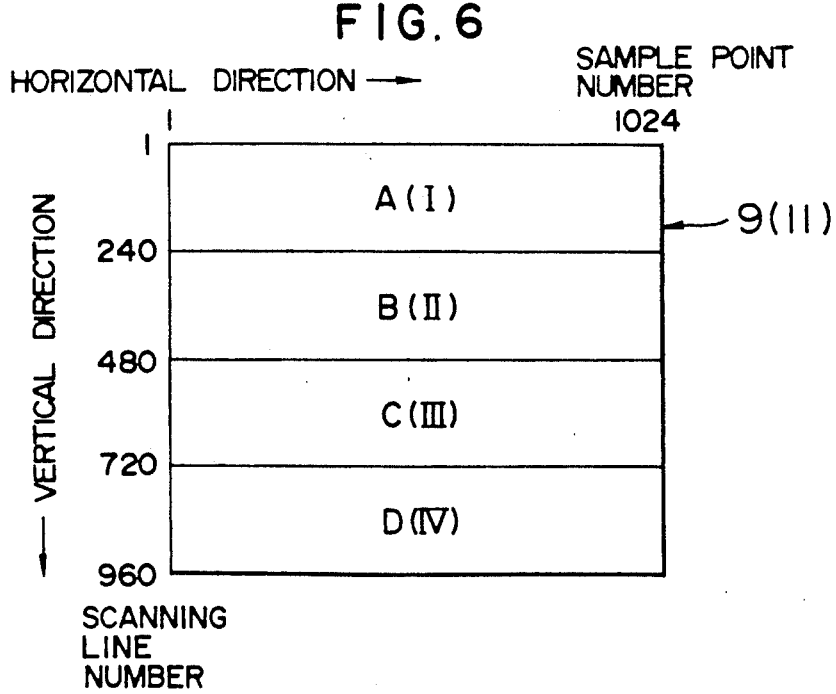
FIG. 6 is a diagram for explaining another embodiment of division and reconstruction of the image data.
Figure 7:
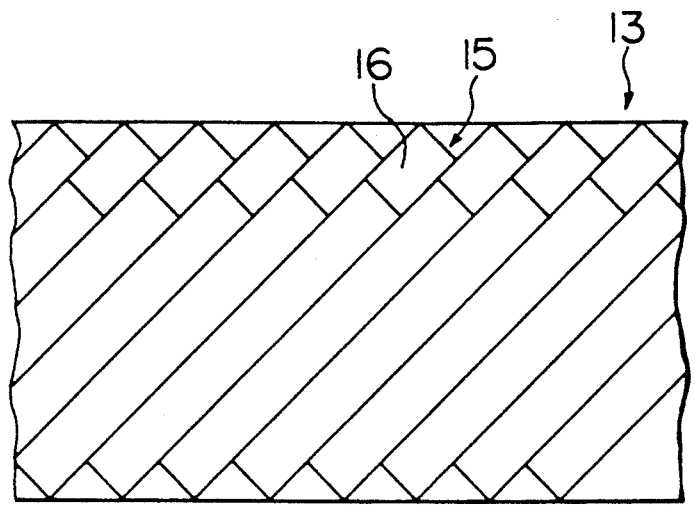
FIG. 7 is a diagram showing another embodiment of the recording state of the divisional image data position information.

The image data are divided and reconstructed in the manner described with reference to FIG. 4 but instead the division and reconstruction may be effected in another manner exemplarily illustrated in FIG. 6 wherein the original sampling image matrix size is vertically divided into four constituent 1024 (horizontal) ×240 (vertical) sampling image matrix sizes and the constituent 1024×240 sampling image matrix sizes are sequentially combined together for reconstruction from upward to downward. The pieces $I_1$, $I_2$, $I_3$, --- of the divisional image data position information are recorded on part of the audio track 14 as illustrated in FIG. 5 but instead they may be recorded on an additional track dedicated to this purpose. Alternatively, the divisional image data position information pieces $I_1$, $I_2$, $I_3$, --- may be recorded on a portion 16 of a video track 15 of the magnetic tape 13 as illustrated in FIG. 7. Further, although in the FIG. 4 embodiment the image data of the 1024×960 sampling image matrix size are divided and the constituent sampling image matrix sizes are reconstructed, the invention is not limited thereto and image data of a larger sampling image matrix size of, for example, 2000×2000 may be employed for division and reconstruction. In the embodiments of FIGS. 4 and 6, the image data are divided at four divisions but the number of divisions may be 8 or 16 in accordance with the amount of input image data or the data rate.

Figure 8:
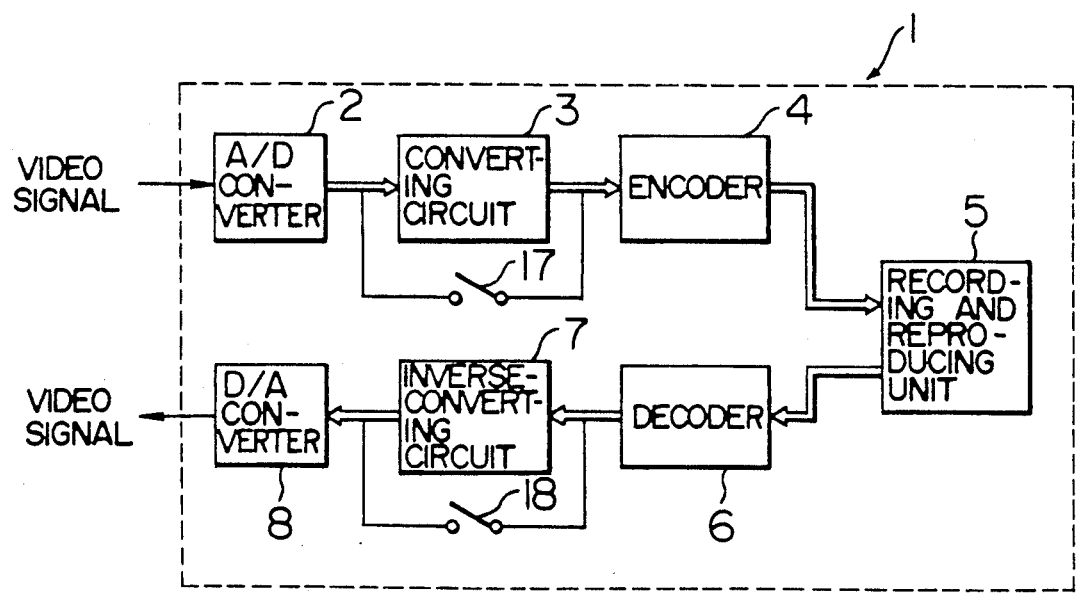
FIG. 8 is a block diagram illustrating a digital data recording and reproducing apparatus according to another embodiment of the invention.

Turning to FIG. 8, there is illustrated, in block form, a digital data recording and reproducing apparatus according to another embodiment of the invention. In this second embodiment, switches 17 and 18 are connected in parallel with the converting circuit 3 and inverse-converting circuit 7, respectively. The switches 17 and 18 are adapted for mode change between the recording and reproducing of the high-definition image from the medical image instrument and the recording and reproducing of the image pursuant to the standard television system. When both the switches 17 and 18 are turned on, the output signal of the A/D converter 2 is directly applied to the encoder 4 and the output signal of the decoder 6 is directly applied to the D/A converter 8 with the result that the image of the standard television system can be recorded and reproduced.

As has been described, in the digital data recording and reproducing apparatus according to the invention, the converting circuit 3 is provided, on the input side of the recording and reproducing unit 5, which divides an input data signal of a large sampling image matrix size by a predetermined fraction, and the inverse-converting circuit 7 is provided, on the outside of the recording and reproducing unit 5, which reconstructs the divisional data signal into the original sampling image matrix size by using the information pieces $I_1$, $I_2$, $I_3$, --- indicative of positions of the divisional image data which are recorded on part of the magnetic recording medium 13 of recording and reproducing unit 5, whereby a high-definition image of the large sampling image matrix size defined by a great number of scanning lines, especially, the high-definition image based on, for example, 1050 scanning lines received from the present-day imaging and displaying medical image instrument can be readily recorded and reproduced. Structurally, the apparatus is relatively simple, giving rise to reduction in size and cost.

What is claimed is:

1. A digital data recording and reproducing apparatus comprising:

A/D converter means for A/D-converting an input video signal having a predetermined image matrix size into digital image data;

matrix converting means for temporarily storing the digital image data corresponding to one A/D converted image in a memory means having a memory address corresponding to said predetermined image matrix size, for dividing the digital image data corresponding to the one image into a predetermined number of digital image data having another predetermined image matrix size smaller than the predetermined image matrix size of the input video signal when the predetermined image matrix size is of a size greater than the capability of a recording/reproducing means of the digital data recording and reproducing apparatus, and for adding position information to the respective divided digital image data;

coding means for adding an error correction code to the digital image data from said matrix converting means, said error code enabling correction of a code error caused at a time of recording at a time of reproducing;

recording/reproducing means for recording the digital image data from said coding means on a magnetic tape at data rate of said another predetermined matrix size and for reproducing the recording digital image data;

decoding means for correcting the code error in the digital image data outputted from said recording-/reproducing means in accordance with said error correction code added by said encoding means;

inverting matrix converting means for temporarily storing the digital image data outputted from said decoding means in a memory means having a memory address corresponding to said predetermined image matrix size in accordance with the address before division on the basis of said position information, and for sequentially reading out the temporarily stored digital image data; and D/A converter means for converting the digital image data outputted from said inverse matrix converting means into analog image data.

2. A digital data recording and reproducing apparatus according to claim 1, wherein said magnetic tape is provided with an audio track, and said recording/reproducing means includes means for recording said position information on the audio track.

3. A digital recording and reproducing apparatus according to claim 1, wherein said matrix converting means divides said digital image data inputted to said matrix converting means into two horizontal and vertical directions to have said another predetermined image matrix size.

4. A digital data recording and reproducing apparatus according to claim 1, wherein said matrix converting means divides said digital image data inputted to said matrix converting means in one of horizontal and vertical directions to have said another predetermined image matrix size.

5. A digital data recording and reproducing apparatus according to claim 1, further comprising:

first switching means disposed in parallel to said matrix converting means for sending the digital image data A/D converted by said A/D converter means to said coding means without passing through said matrix converting means; and second switching means disposed in parallel to said inverse matrix converting means for sending the digital image data outputted from said decoding means to said D/A converter means without passing through said inverse matrix converting means;

said first and second switching when activated enable direct application of the A/D converted digital image data from said A/D converting means to said coding means and direct application of the digital image data from said decoding means to said D/A converting means so that an image of a standard television system can be recorded and reproduced.

6. A digital data recording and reproducing apparatus according to claim 5, wherein said magnetic tape is provided with an audio track, and said recording/reproducing means includes means for recording said position information on the audio track.

7. A digital recording and reproducing apparatus according to claim 5, wherein said matrix converting means divides said digital image data inputted to said matrix converting means into two horizontal and vertical directions to have said another predetermined image matrix size.

8. A digital data recording and reproducing apparatus according to claim 5, wherein said matrix converting means divide said digital image data inputted to said matrix generating means in one of horizontal and vertical directions to have said another predetermined image matrix size.

* * * * *